May 27, 1952 R. M. BURGESS 2,598,219
TRACTOR AND CULTIVATOR ATTACHMENT
Filed Nov. 7, 1946 4 Sheets-Sheet 1

INVENTOR.
ROBERT M. BURGESS,
BY *Victor J. Evans & Co.*
ATTORNEYS

May 27, 1952      R. M. BURGESS      2,598,219
TRACTOR AND CULTIVATOR ATTACHMENT
Filed Nov. 7, 1946      4 Sheets-Sheet 2
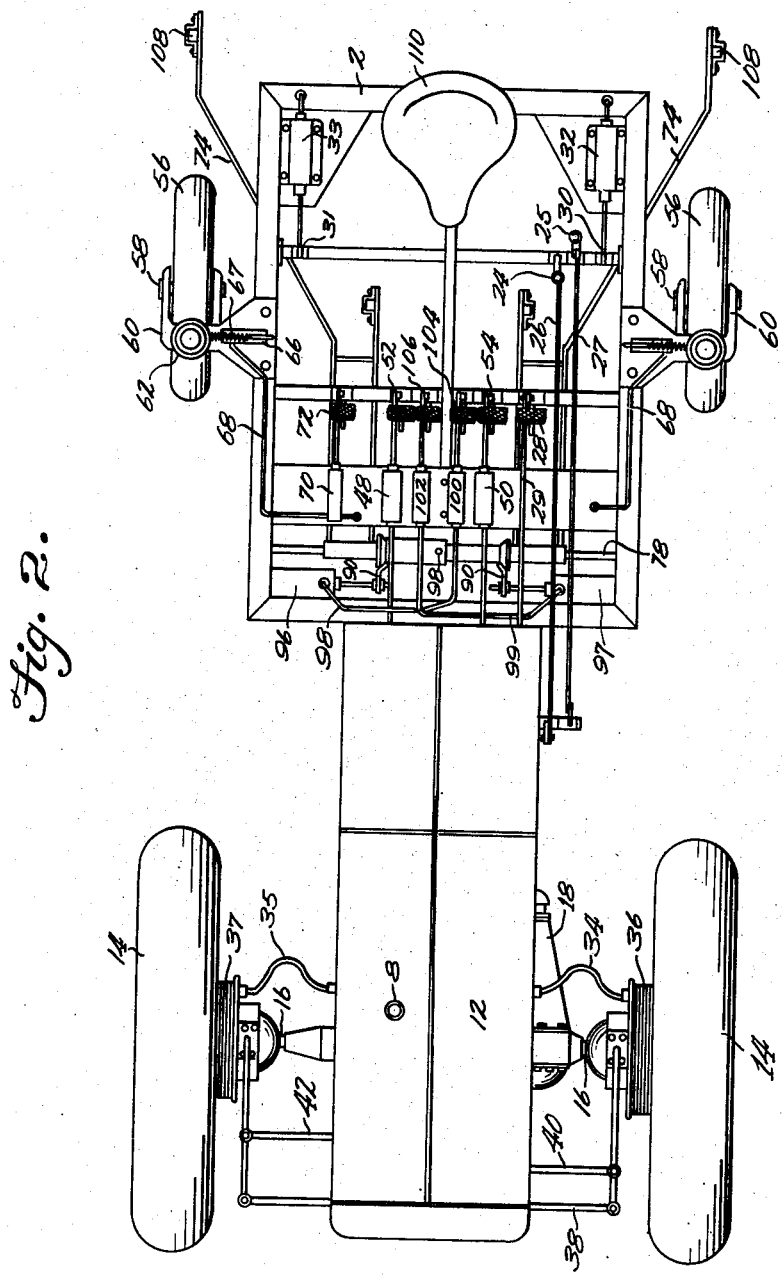
*INVENTOR.*
ROBERT M. BURGESS,
BY *Victor J. Evans & Co.*
ATTORNEYS May 27, 1952  R. M. BURGESS  2,598,219
TRACTOR AND CULTIVATOR ATTACHMENT
Filed Nov. 7, 1946  4 Sheets-Sheet 3

INVENTOR.
ROBERT M. BURGESS,
BY *Victor J. Evans & Co.*
ATTORNEYS

May 27, 1952   R. M. BURGESS   2,598,219
TRACTOR AND CULTIVATOR ATTACHMENT
Filed Nov. 7, 1946   4 Sheets-Sheet 4
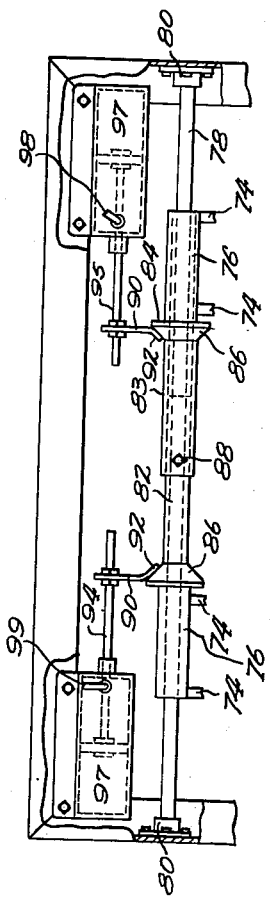
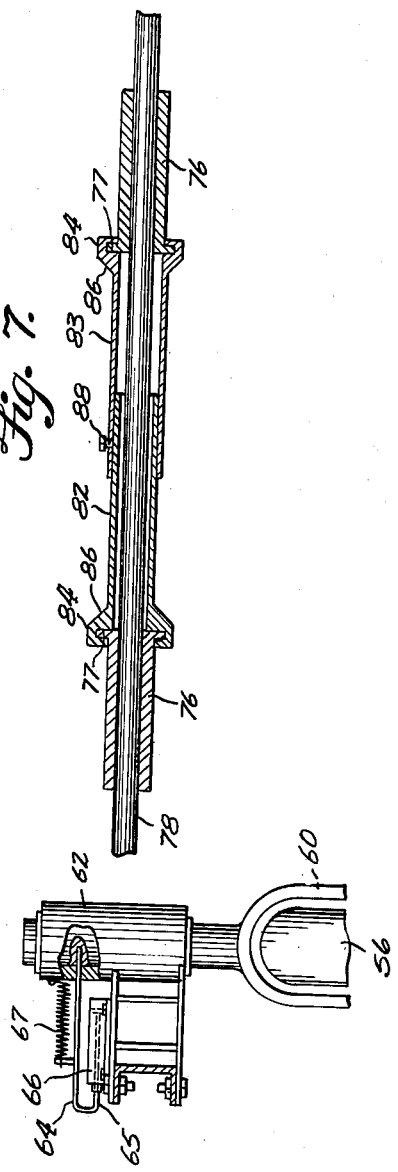
*INVENTOR.*
ROBERT M. BURGESS,
BY
ATTORNEYS

Patented May 27, 1952

2,598,219

UNITED STATES PATENT OFFICE 2,598,219

TRACTOR AND CULTIVATOR ATTACHMENT

Robert M. Burgess, Cullman, Ala.

Application November 7, 1946, Serial No. 708,292

3 Claims. (Cl. 97—47)

My present invention relates to an improved tractor and more particularly to the novel and unique arrangement of parts comprising the structure of the tractor wherein the front driving wheels are hydraulically steered; the front wheel brakes are independently operable to facilitate turning the vehicle; the rear caster type wheels normally locked in position parallel to the tractor may be unlocked to co-act with the front wheels in making extremely short turns; and the earth working implements mounted rearward of the tractor are movable laterally to compensate for variations in the rows or to avoid obstacles.

Other and more specific reference to the various improved features of the tractor of my invention will hereinafter be made.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Figure 2 is a top plan view thereof.

Figure 5 is a top plan view of the implement moving mechanism.

Figure 6 is a detail view of the locking mechanism for the rear wheels; and

Figure 7 is a longitudinal vertical sectional view of the telescoping structure of Figure 5.

Figure 1:
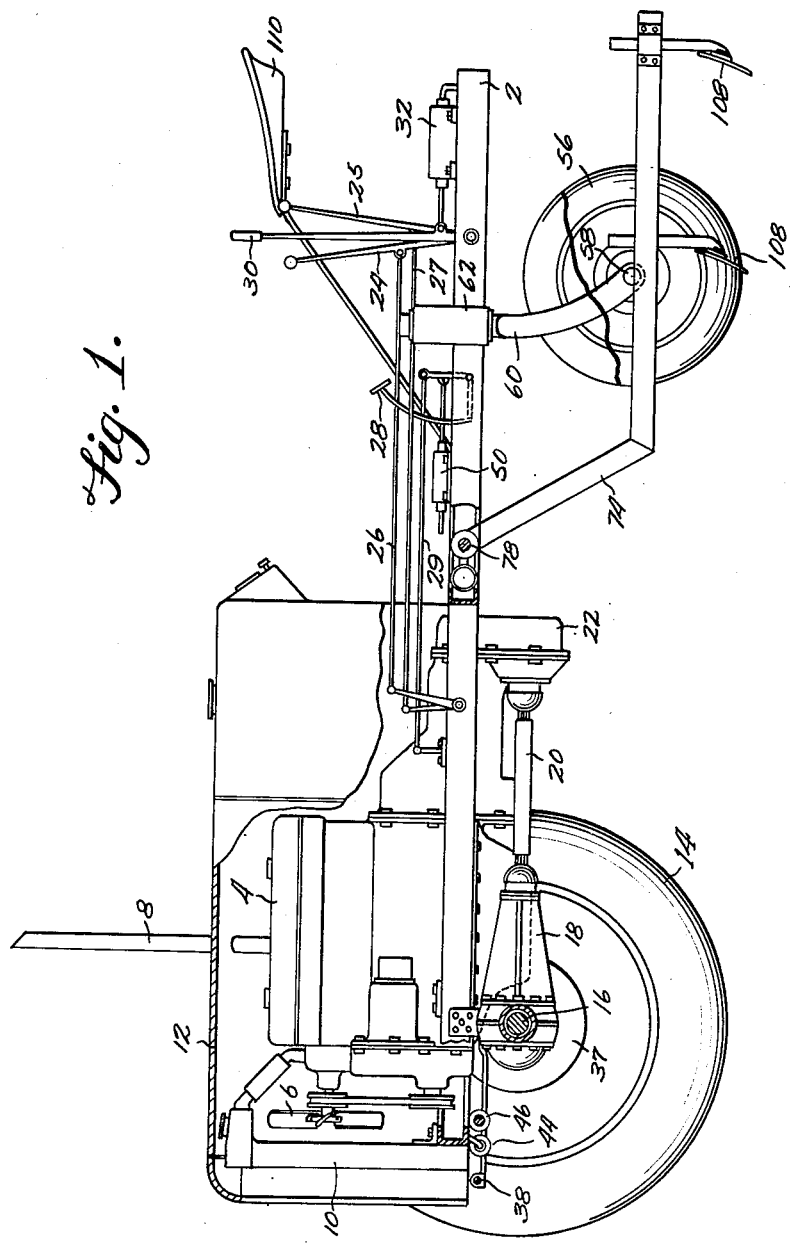
Figure 1 is a side elevational view of the tractor of my invention partially broken away to show more clearly the front wheel structure.
Figure 4:
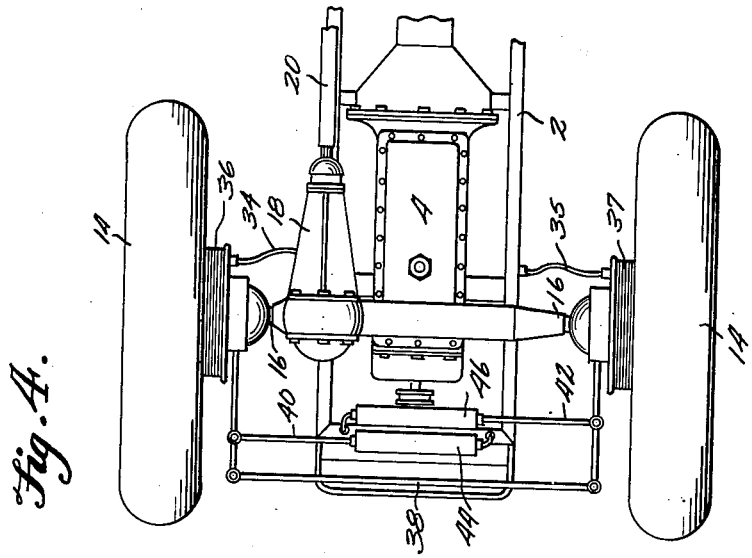
Figure 4 is a partial bottom plan view.
Figure 3:
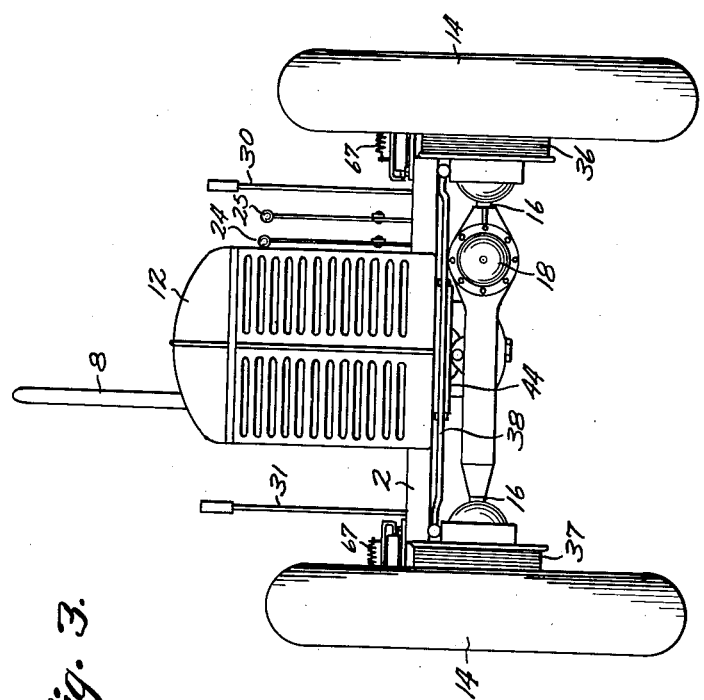
Figure 3 is a front elevational view.

Referring now to the illustrated embodiment of my invention, I employ a tractor having a frame 2 supporting a conventional internal combustion engine 4 having a fan 6 and radiator 10 and an exhaust pipe 8 extending upwardly from the hood 12.

The large rubber tired front wheels 14 are mounted upon the front axle 16 which is driven through the differential 18 from the drive shaft 20 and the transmission 22 rearward of the engine.

Gear shift levers 24 and 25 actuate rods 26 and 27, respectively, connecting with the transmission 22 and the clutch pedal 28 through the clutch rod 29 operates in conventional manner to disengage the engine drive shaft from the transmission.

Brake levers 30 and 31 located on opposite sides of the tractor frame 2 are operable connected with the hydraulic cylinders 32 and 33 respectively which create pressure through the hose 34 and 35 to the brake drums 36 and 37, respectively, for the front driving wheels.

A tie rod 38 connects the two front driving and steering wheels and the steering rods 40 and 42 operate under pressure from the cylinders 44 and 46 respectively to turn the front wheels in steering operation under pressure from the pressure or master cylinders 48 and 50 which are under control of the steering pedals 52 and 54 rearward of the tractor engine.

The small rear wheels of the caster type 56 are mounted upon the axles 58 in the forks 60 which forks are pivotally mounted on the tractor frame 2. A key 64 has an arm 65 forming the piston of the cylinder 66 and pressure is applied to the piston in the cylinder to remove the key under tension of the spring 67 through the pipe 68 from the pressure cylinder 70 operably connected with the pedal 72.

The implement frame arms 74 are formed with hubs 76 having flanges 77 mounted on the lateral shaft 78 supported by collars 80 on the tractor frame. The telescoping tubes or sleeves 82 and 83 are formed with collars 84 engaging the flanges 77 and these collars are beveled as at 86 to receive the arms 90 through the elbows 92 depending from the piston rods 94 and 95 of the cylinders 96 and 97 respectively. The telescoping sleeves 82 and 83 are held in adjusted positions by a set screw 88 when it is desired to control the movement of both sets of cultivators with one of the cylinders.

The hydraulic pressure lines 98 and 99 carry fluid under pressure from the cylinders 100 and 102 and the pedals 104 and 106 are operably connected with the pistons of the latter cylinders to compress the fluid.

Cultivators 108 are shown mounted on the cultivator frame 74, and a seat 110 for the driver of the tractor is illustrated resiliently supported from the tractor frame above the rear wheels.

The many advantages of front wheel drive in tractors are obvious and need no expansion here. However the hydraulically operated steering mechanism for the front wheels affords a speed of maneuvering not available in manual steering mechanisms. In addition to the pedal control of the front wheels, either of the brake levers 30 or 31 may be actuated to apply the selected brake to retard the wheel on the inside of the proposed turn to shorten the radius and facilitate the turn. Further, while the rear wheels are normally locked in forward position the keys may be withdrawn by operation of the pedal 72 to free the forks of the rear wheels whereupon in a turn, the wheels will pivot and with one front wheel braked, the vehicle will pivot upon the braked wheel.

As the tractor is following the rows to be cultivated the cultivators will follow in the proper position, but if the row should vary or an obstacle such as a rock appear in the path, the operator by simply depressing one or both of the pedals 104 or 106 may shift laterally the hub of the implement frame and thus move laterally the tools.

The above and many other advantages will be apparent to those skilled in the art and need no further comment here.

Having thus fully described my invention, what I claim as new and desire to secure by Letters Patent is:

1. In a cultivator attachment for a tractor, the combination which comprises a tractor having a chassis, front and rear wheels on which the chassis is mounted, a seat positioned on the chassis, a transversely disposed shaft positioned in the chassis, hubs slidably mounted on the shaft, telescoping sleeves carried by the hubs, arms extended from said telescoping sleeves, hydraulic cylinders mounted on the chassis parallel to and spaced from the said shaft, connecting rods extended from said hydraulic cylinders, means adjustably connecting the said connecting rods to the arms extended from the said sleeves, cultivator carrying frames carried by the said hubs, cultivator blades depending from the said frames, foot pedals pivotally mounted on the chassis and positioned for operation by an operator on the said seat, and means actuating the said connecting rods by the said foot pedals for laterally adjusting the positions of the cultivators.

2. In a cultivator attachment for a tractor, the combination which comprises a tractor having a chassis, front and rear wheels on which the chassis is mounted, a seat positioned on the chassis, a transversely disposed shaft positioned in the chassis, hubs slidably mounted on the shaft, telescoping sleeves carried by the hubs, arms extended from said telescoping sleeves, hydraulic cylinders mounted on the chassis parallel to and spaced from the said shaft, connecting rods extended from said hydraulic cylinders, means adjustably connecting the said connecting rods to the arms extended from the said sleeves, cultivator carrying frames carried by the said hubs, cultivator blades depending from the said frames, foot pedals pivotally mounted on the chassis and positioned for operation by an operator on the said seat, means actuating the said connecting rods by the said foot pedals for laterally adjusting the positions of the cultivators, and power means in the chassis for driving the front wheels of the tractor.

3. In a cultivator attachment for a tractor, the combination which comprises a tractor having a chassis, front and rear wheels on which the chassis is mounted, brake means for said front wheels, a seat positioned on the chassis, a transversely disposed shaft positioned in the chassis, hubs slidably mounted on the shaft, telescoping sleeves carried by the hubs, arms extended from said telescoping sleeves, hydraulic cylinders mounted on the chassis parallel to and spaced from the said shaft, connecting rods extended from said hydraulic cylinders, means adjustably connecting the said connecting rods to the arms extended from the said sleeves, cultivator carrying frames carried by the said hubs, cultivator blades depending from the said frames, foot pedals pivotally mounted on the chassis and positioned for operation by an operator on the said seat, means actuating the said connecting rods by the said foot pedals for laterally adjusting the positions of the cultivators, power means in the chassis for driving the front wheels of the tractor, and hydraulic cylinders positioned on the chassis for actuating the said brake means for the front wheels.

ROBERT M. BURGESS.

REFERENCES CITED

The following references are of record in the file of this patent:

UNITED STATES PATENTS

| Number | Name | Date |
|---|---|---|
| 1,376,756 | Gallagher | May 3, 1921 |
| 1,687,720 | Garner | Oct. 16, 1928 |
| 2,070,425 | Engel | Feb. 9, 1937 |
| 2,109,668 | Johnston et al. | Mar. 1, 1938 |
| 2,157,273 | Stancil | May 9, 1939 |
| 2,206,283 | Jacobs et al. | July 2, 1940 |
| 2,224,800 | Seright | Dec. 10, 1940 |
| 2,245,682 | Kerr | June 17, 1941 |
| 2,483,649 | Le Blanc | Oct. 4, 1949 |
| 2,484,069 | Boncompain | Oct. 11, 1949 |

FOREIGN PATENTS

| Number | Country | Date |
|---|---|---|
| 394,759 | Germany | May 6, 1924 |